United States Patent
Rankin et al.

(10) Patent No.: US 6,879,838 B2
(45) Date of Patent: Apr. 12, 2005

(54) DISTRIBUTED LOCATION BASED SERVICE SYSTEM

(75) Inventors: Paul John Rankin, Horley (GB); Jonathan Charles Griffiths, Fremont, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 475 days.

(21) Appl. No.: 09/839,558

(22) Filed: Apr. 20, 2001

(65) Prior Publication Data

US 2002/0155844 A1 Oct. 24, 2002

(51) Int. Cl.⁷ ................................................ H04Q 7/20
(52) U.S. Cl. .......................... 455/456.6; 455/414.2; 455/456.1; 455/456.3; 701/200
(58) Field of Search ................. 455/403, 404.2, 455/414.2, 456.1, 456.3, 456.6, 556, 456; 342/457; 701/200; 340/905

(56) References Cited

U.S. PATENT DOCUMENTS

| | | | |
|---|---|---|---|
| 5,561,704 A | | 10/1996 | Salimando |
| 5,914,668 A | * | 6/1999 | Chavez et al. .............. 340/7.39 |
| 5,930,699 A | | 7/1999 | Bhatia |
| 6,014,090 A | * | 1/2000 | Rosen et al. ................. 340/905 |
| 6,055,434 A | | 4/2000 | Seraj |
| 6,091,956 A | * | 7/2000 | Hollenberg .............. 455/456.5 |
| 6,115,667 A | | 9/2000 | Nakamura |
| 6,119,098 A | * | 9/2000 | Guyot et al. .................. 705/14 |
| 6,123,259 A | | 9/2000 | Ogasawara |
| 6,148,262 A | | 11/2000 | Fry |
| 6,157,841 A | * | 12/2000 | Bolduc et al. ........... 455/456.5 |
| 6,195,646 B1 | * | 2/2001 | Grosh et al. .................. 705/26 |
| 6,233,430 B1 | * | 5/2001 | Helferich .................... 340/7.21 |
| 6,332,127 B1 | * | 12/2001 | Bandera et al. ............... 705/14 |
| 6,353,398 B1 | * | 3/2002 | Amin et al. ........... 340/995.12 |
| 6,360,164 B1 | * | 3/2002 | Murayama .................. 701/200 |
| 6,393,292 B1 | * | 5/2002 | Lin .......................... 455/456.5 |
| 6,404,408 B1 | * | 6/2002 | Emerson, III ................ 345/2.1 |
| 6,453,161 B1 | * | 9/2002 | Touati et al. ................ 455/433 |
| 6,459,913 B2 | * | 10/2002 | Cloutier ...................... 455/567 |
| 6,463,142 B1 | * | 10/2002 | Kilp ....................... 379/201.06 |
| 6,542,812 B1 | * | 4/2003 | Obradovich et al. ........ 701/207 |
| 6,549,625 B1 | * | 4/2003 | Rautila et al. .............. 380/258 |
| 6,594,498 B1 | * | 7/2003 | McKenna et al. .......... 455/517 |
| 6,647,257 B2 | * | 11/2003 | Owensby ................. 455/414.1 |
| 6,675,014 B1 | * | 1/2004 | Sundquist ................ 455/435.1 |
| 6,681,114 B2 | * | 1/2004 | Chang et al. ............. 455/456.3 |
| 2001/0044309 A1 | * | 11/2001 | Bar et al. .................... 455/456 |
| 2002/0046084 A1 | * | 4/2002 | Steele et al. .................. 705/14 |
| 2002/0090927 A1 | * | 7/2002 | Allande et al. ............. 455/408 |
| 2003/0032409 A1 | * | 2/2003 | Hutcheson et al. ......... 455/414 |
| 2004/0067773 A1 | * | 4/2004 | Rachabathuni et al. ..... 455/560 |

FOREIGN PATENT DOCUMENTS

| EP | 1199899 A1 | * | 4/2002 | ............ H04Q/7/22 |
|---|---|---|---|---|
| WO | WO9857506 | | 12/1998 | |
| WO | WO0004730 | | 1/2000 | |
| WO | WO0069180 | | 11/2000 | |

* cited by examiner

*Primary Examiner*—William Trost
*Assistant Examiner*—James Ewart
(74) *Attorney, Agent, or Firm*—Michael E. Schmitt

(57) ABSTRACT

A system, apparatus, and method for providing a distributed location based service system to a mobile user. Information related to a particular geographic location may be electronically transferred to a mobile electronic device, without a request from the user, and interpreted locally on the device in the form of a virtual map of location based resources. The mobile device is capable of determining its location using a GPS (Global Positioning System) or a process of measurement and prediction based on calculation. The mobile device can then use the location information and compare it to available location based resources within the device.

27 Claims, 6 Drawing Sheets

DISTRIBUTED LOCATION BASED SERVICE SYSTEM

BACKGROUND OF THE INVENTION

1. Field of the Invention

The present invention relates to mobile interactive service systems, and, more particularly, to distributed location based service systems.

2. Description of the Related Art

Mobile communication systems, such as cellular wireless networks, provide communication means for mobile users. In addition to providing two way communication, wireless networks can be used to provide a variety of mobile information and transaction services based on the location, time and other information filtering preferences of the user. Mobile services are typically provided using voice, text or graphical information. A user may request information about the location of the nearest restaurant, ATM or other local amenity, and be presented with a graphical map, local address information or directions. Alternatively, a user may be "pushed" information, such as the proximity of a nearby shop with a special offer which matches the personal preferences of the mobile user.

Mobile location information updates are either triggered by user intervention, e.g., a request for information; the result of periodic updating, e.g., regular polling of a mobile device to determine location; or triggered by some system event, e.g., the user makes a call, changes cell or switches the mobile device on or off. The matching of a location to a service is accomplished centrally within the network. The matching operation increases network interaction for the mobile device, thereby causing increased latency in transactions between network and mobile device, increased network traffic, and a decreased ability to provide push services.

What is needed is a system and mobile communications device whereby accurate location based services may be pushed to a mobile user. What is further needed is an associated system and method which can provide such push services to a mobile communications device.

SUMMARY OF THE INVENTION

The present invention provides a distributed location based information service system which permits information in the form of a virtual map of location based resources related to a particular geographic location to be electronically transferred to a mobile electronic device, and to be interpreted locally by that device. The mobile device is equipped with a means of determining its location and is able to compare its current location to available location based resources independently of the network.

The present invention, in one form thereof, includes a mobile communications device which overcomes the shortcomings of the prior art. The mobile communications device could be a mobile phone, pager, wireless equipped portable data assistant, personal computer, or other suitable device. The mobile device may be carried by a person or may be located in a car, boat, aircraft, train, or other conveyance. The mobile communications device contains a location determination system which allows the device to determine its location either from the network or independently from the network. The mobile communication device triggers a determination of its location. This in turn will cause a map to be downloaded to the device from a location resource server. The device contains memory in which to store the downloaded map and to store algorithms. The downloaded map may user preferences regarding the type of information which the user desires to obtain. The user preferences may be held on the device itself to facilitate updating of preferences or to protect the privacy of the user. The device also contains a processor which operates on the basis of algorithms to interpret the downloaded map. The algorithms determine the current geographic location of the mobile device by a process of both measurement and prediction, or interpolation, based on calculation. In essence, the invention provides a mobile device which is fundamentally autonomous by determining its location and comparing that information to a database held on the device. This feature of the present invention facilitates very rapid interaction with local services.

The invention in one embodiment thereof comprises a mobile communication device including a processor, a radio frequency transceiver connected to the processor, and an electronic memory, output device, and a location determination element connected to the processor. Information regarding resources available at the location of the mobile communication device may be downloaded to the device, without a request from the device, whereby the processor can process the information and processed information is made available at the output element.

The invention, in another embodiment, comprises a communication system. The system includes a mobile communication device including a processor, a radio frequency transceiver connected to the processor, and an output device, memory and location determination element connected to the processor. The system further includes a location resource server including a memory in which data is stored, the data pertaining to resources which are available at selected geographic locations. The location resource server is capable of establishing communication with the mobile communication device. Thus, the location resource server can establish communication with the device and download information to the mobile communication device without a request for information from the device, whereby the device can process such information and output processed information on its output. The processed information pertains to resources available at the location of the mobile communication device.

The invention, in another embodiment, comprises a method for supplying geographically based resource information to a mobile communication device. The method includes the steps of determining the location of the device, communicating the location to a location resource server, selecting information based on the communicated determined location, and downloading the selected information to the device.

An advantage of the present invention is the increased ability to provide opportunistic or push services where a user is offered information without initiating a request.

Another advantage of the present invention is that the current geographic location of a mobile device may be determined accurately within the mobile device by a process of both measurement and prediction, or interpolation, based on calculation.

Yet another advantage is that network traffic and latency are reduced by distributing the process of location to information matching and using the process of location prediction.

Still another advantage is that location accuracy is improved by distributing the process of location to information matching and using a process of location prediction.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
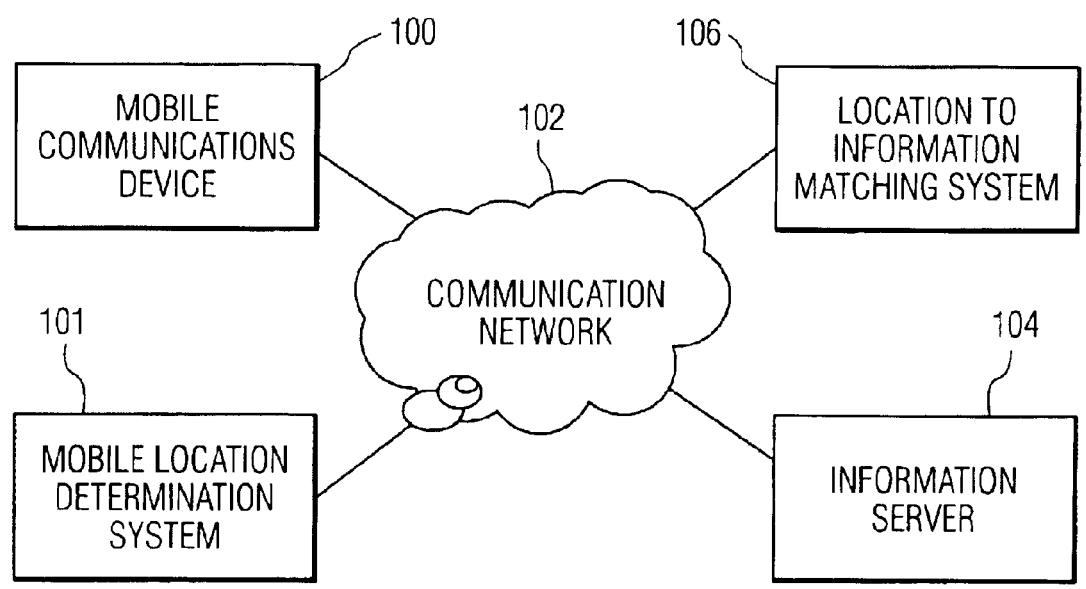
FIG. 1 is a prior art mobile location based information system.

Referring now to the drawings and particularly to FIG. 1, a prior art mobile location based information system is shown. Mobile communications device 100 is in communication with communication network 102. The location of mobile communications device 100 is determined by mobile location determination system 101 which may be entirely network based. The time difference of arrival of the mobile signal at three or more base station sites may be used to triangulate the position of mobile communications device 100. Alternatively, mobile communications device 100 may be equipped with a self-contained location determination capability; for example, GPS (Global Positioning System). Location technologies could use both measurements made by mobile communications device 100 and mobile location determination system 101 to determine the location of mobile communications device 100.

The location of mobile communications device 100 is passed via communication network 102 to location to information matching system 106 which matches the location of the user to available information for that location. Information server 104 provides information to the user via communication network 102. The information may be provided to mobile communications device 100 by the passing of a unified resource locator (URL) or other pointer, such as a telephone number, from location to information matching system 106. Mobile communications device 100 may then directly contact information server 104 through communication network 102.

Figure 2:
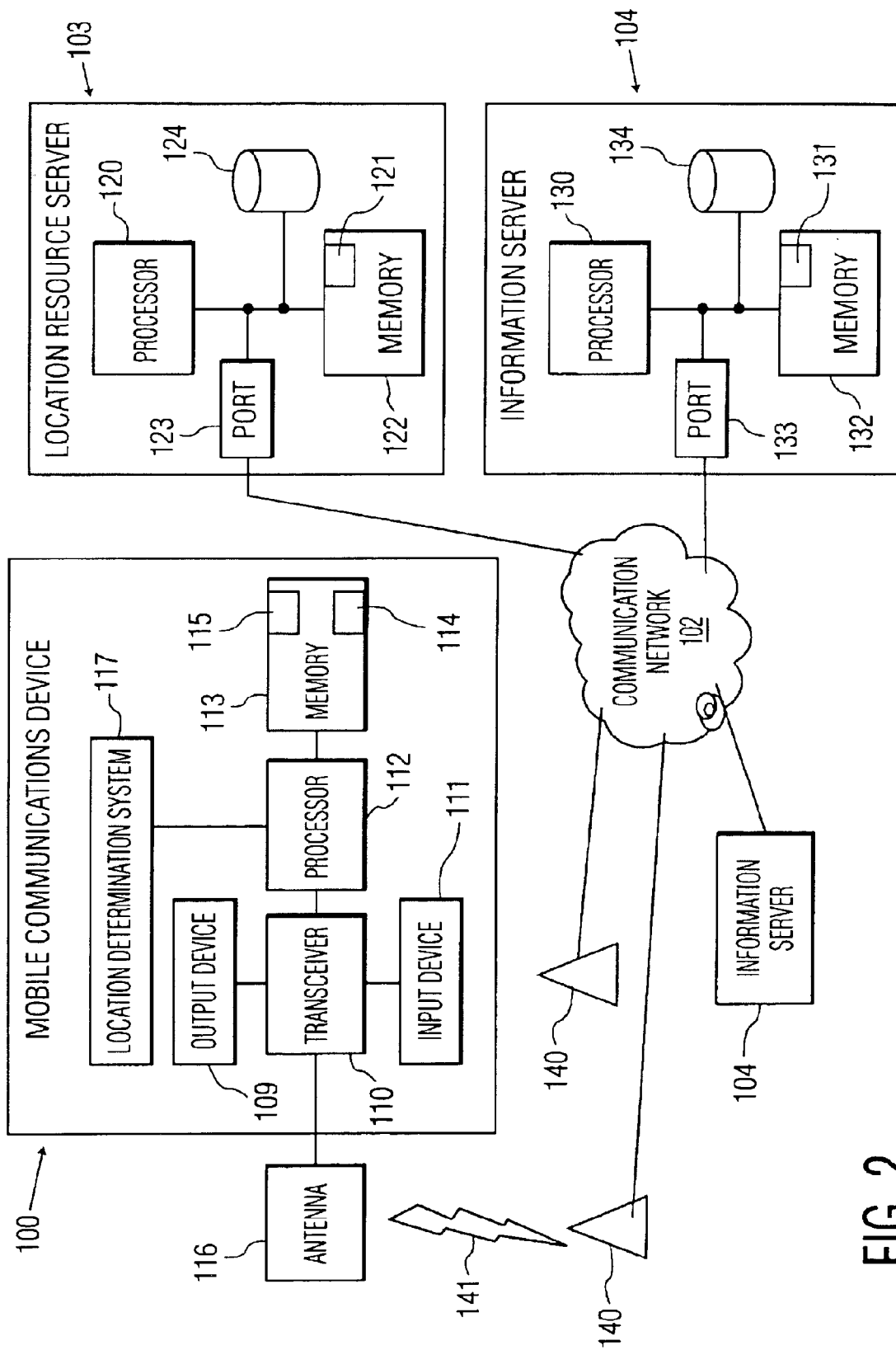
FIG. 2 is a preferred embodiment of the system according to the present invention and including the mobile communications device.

FIG. 2 is a preferred embodiment of a mobile distributed location based information service system. Mobile communications device 100 communicates with communication network 102 via wireless base stations 140 and wireless link 141. Mobile communications device 100 can be a mobile phone, pager, wireless equipped portable data assistant (PDA), personal computer, or other suitable device. Mobile communications device 100 includes radio transceiver 110 connected to antenna 116 and controlled by processor 112. Processor 112 executes program instructions 114 held in memory 113. Memory 113 includes random access memory for program execution and non volatile memory 115 for storage of program instructions 114 and system data. In addition, mobile communications device 100 includes input device 111, e.g., an alphanumeric keyboard, microphone or touch screen, and output device 109, e.g., an LCD graphical display, earpiece, audible device, visual device, or any other such way to communicate information to the user.

Mobile communications device 100 includes location determination system 117 by which mobile communications device 100 is able to accurately determine its current geographic location. Such determination may be made either from the network 102 or independently of network 102. Device 100 triggers the determination of its location. One well-known method to provide the location determination function would be to use a GPS (Global Positioning System) receiver which is able to receive satellite signals to determine the location to within approximately +/−10 meters. GPS is an example of a self-contained location system. Another example of a self-contained location system is a system that receives signals from short range wireless beacons, e.g., radio, acoustic or infrared beacons, which emit an identifying location signal to mobile communications devices 100 within range. As the user moves from place to place and enters the range of new beacons, the location of mobile communications device 100 may be updated. Many other implementations of location determination system 117, including the use of the time difference of arrival of a mobile signal at three or more base station sites to triangulate the position of mobile communications device 100, are possible depending on the application. Mobile communications device 100 may be carried by a person or may be located in a car, boat, aircraft, train, or other conveyance.

Once the location of device 100 has been determined, location resource server 103 provides an electronic map or database of location based information services to device 100. The database can directly store information related to a location, or, alternatively, the database could store a resource locator such as a telephone number or an email address. Location resource server 103 could both store the database and match the location of mobile communications device 100 to available resources. Location resource server 103 maintains the centralized record of geographic areas mapped to information or transactional services. Location resource server 103 can download the database to mobile communications device 100 on a periodic basis, on request by the user, or by other events. The database can interact with user preferences that modify the behavior of mobile communications device 100 in encounters with location based information services. Preferences may be stored on location resource server 103 or entered directly by a user into mobile communications device 100 by means of a user interface. The preferences may be uploaded via mobile communications device 100 and communication network 102 or modified via a user interface associated with location resource server 103, such as a web server user interface.

The user preferences modify the interaction with a location based service. The user preferences may include geographical information which provides a filter to eliminate any unnecessary information, e.g., information about a resource outside of the current geographic region of mobile communications device 100. Further, the user preferences may include an item selection process. For instance, a user may set his preferences to forbid any information that would be pushed to him regarding the location of an ATM or restaurant. A time preference may also be utilized by a user of mobile communications device 100. If the user is at work from the hours of 9 A.M. to 5 P.M., for instance, he may not want any information to be pushed to him. The number of items pushed to a user could also be controlled with user preferences. For example, if while in a certain location there are 5000 restaurants, a user preference could truncate the number of items presented to facilitate use of the information. The preferences may further accept or reject categories, or eliminate service types (push/pull). Additional device preferences may include device limitations such as storage availability for downloaded maps, and user interface limitations which further modify the unique location database records for a particular mobile communications device 100. By providing an enhanced match of device location to available information service on mobile communications device 100 through the use of user preferences, network interaction is minimized, latency effects are reduced, and the power used by the positioning system on the mobile device can be reduced. Furthermore, downloaded map information may be suitable to provide for the variable system loading in mobile networks where low system loading may be used overnight to download new map database information; therefore minimizing real-time network interaction during heavier usage periods.

Once equipped with location determination system 117 and the downloaded electronic service/geographic database, mobile communications device 100 is able to autonomously match its location to available information services. This embodiment is well-suited to opportunistic or push services which may require a rapid response to alert the user to a new location match. The location database and current location information is immediately available on mobile communications device 100. Mobile communications device 100 has memory 113, which can store a downloaded map, and processor 112, which operates on the basis of algorithms to interpret the downloaded map. Processor 112 takes control of location determination system 117 and informs the algorithms where the device is at any one time. Interaction with communication network 102 is not required to communicate current geographic location or receive information relating to a location, thereby decreasing communication latency.

All or part of the electronic service/geographic location database could be copied into mobile communications device 100. The amount of data stored by mobile communications device 100 can vary and depends on the available storage, the number of unique geographic locations, and network parameters such as communication latency and bandwidth capability. All or part of the location database could be downloaded to mobile communications device 100 using any suitable protocol over wireless link 141. In a cellular wireless system, the method could include SMS (short message service), WAP (wireless access protocol), or other protocol over a circuit switched network or packet data link. The update of a new map portion could be triggered by several processes. In a cellular system, the update could be triggered by registration with the cell which is in communication with mobile communications device 100. Another process updates the location of mobile communications device 100 on a periodic basis using location determination system 117; thus triggering the download of a new map section if mobile communications device 100 had moved to a location requiring a new map database fragment. The update could also be triggered when user preference database records are updated, when mobile communications device 100 is turned on or off, or upon user request.

By further reference to FIG. 2, location resource server 103 includes a computer system with non volatile storage 124, e.g., fixed disk storage, stored programs, or data relating to location and services; memory 122; programs 121; processor 120 which executes program instructions; and port 123 which connects location resource server 103 to communication network 102. Information server 104 includes a computer system with non volatile storage 134, e.g., fixed disk storage, stored programs, or data relating to services and information; memory 132; programs 131; processor 130 which executes program instructions; and port 133 which connects information server 104 to communication network 102. Communication network 102 may be a packet switched or circuit switched network, e.g., the public switched telephone network (PSTN) or the Internet. Information relating to a particular geographic location could be served to mobile communications device 100 by any number of information servers 104 which are connected to communication network 102. Information server 104 can hold additional information about a particular location which cannot be completely stored in the individual records in location resource server 103. The information used by mobile communications device 100 could be the URL for an HTTP (web server) or WAP (wireless access protocol) server. In an alternative embodiment, location resource server 103 and information server 104 may be combined into a single system.

Figure 3:
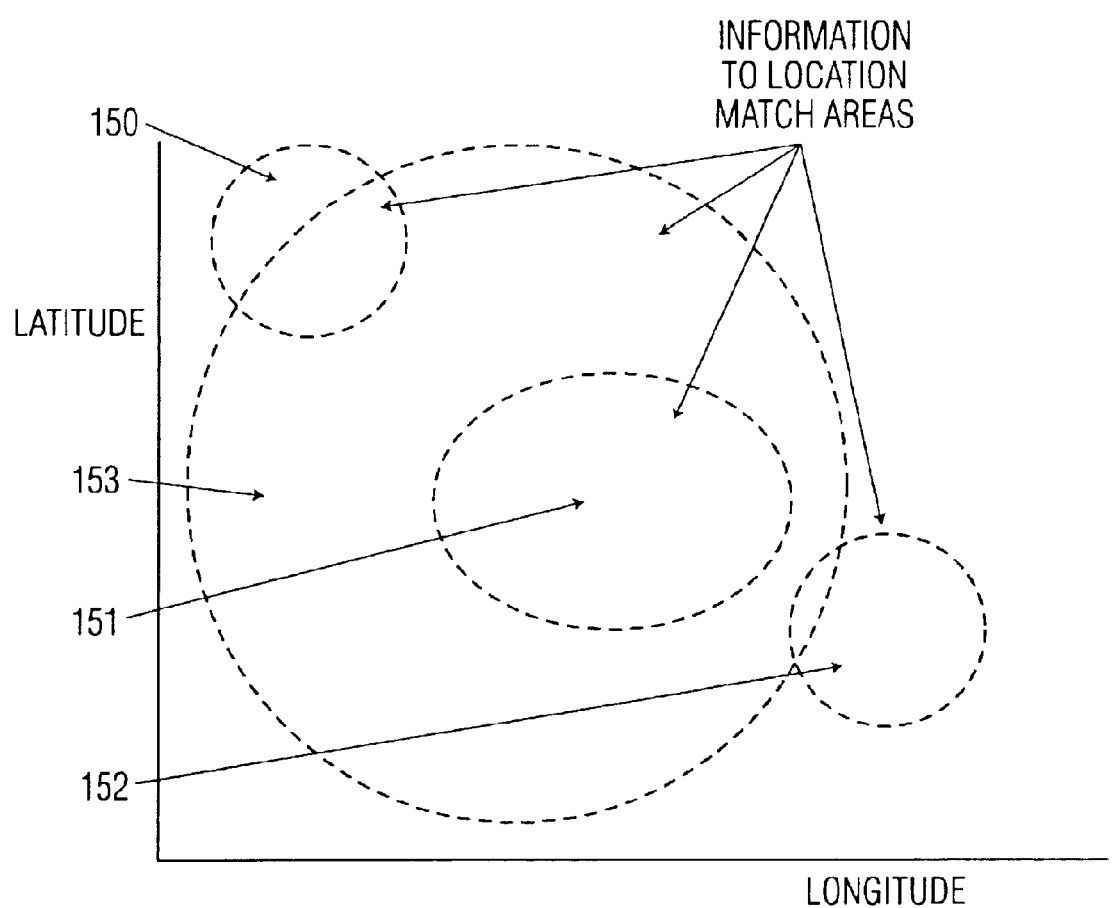
FIG. 3 is a schematic representation of information to location match areas overlaid on a geographic map.

FIG. 3 is a map which depicts information to location match areas. The map includes latitude and longitude coordinate axes, but other coordinate systems may be used to define the unique locations relevant to a particular information service. Information to location match areas are denoted by areas 150, 151, 152, and 153. Four (4) unique information or transactional services could be defined as relevant to the areas. For example, area 150 could define an area around a shop which desires to broadcast an advertisement to mobile devices carried by pedestrians who walk within area 150. Area 151 may be a bus station which desires to make available a bus timetable to mobile users inquiring about bus schedules while in area 151. Area 152 could be an airport which desires to broadcast continually updated gate information to users inside the terminal. In addition, information to location match areas may overlap; thus defining layered regional and local services. Area 153 defines a regional area by substantially overlapping areas 150, 151, and 152. In each area, a unique set of latitude and longitude data can describe the area associated with an information service. Once a mobile device is determined to be within a defined area, an action may be triggered. The type of action or result may be determined by the information associated with the location.

Figure 4:
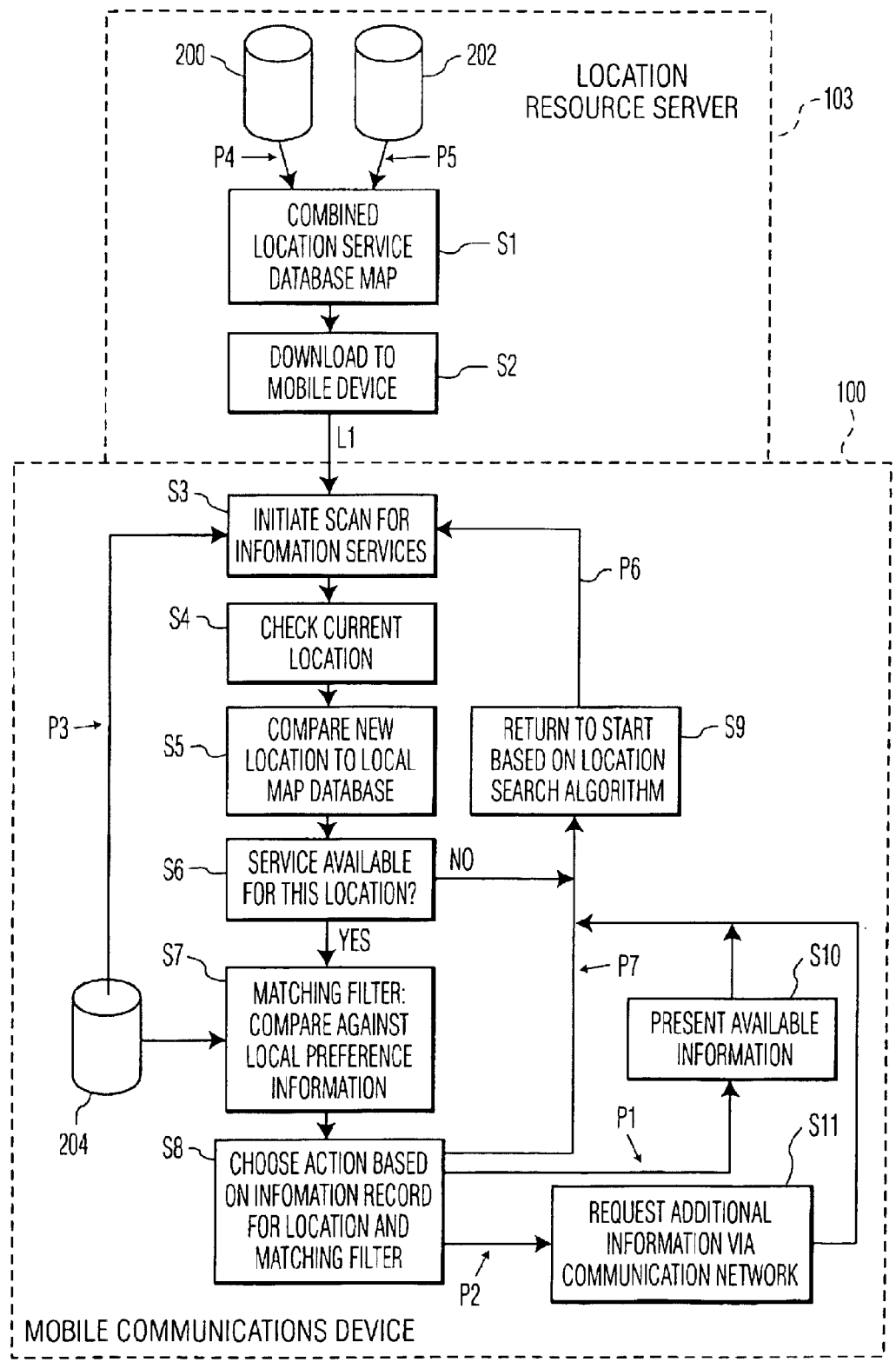
FIG. 4 is a flowchart which illustrates the process of location based service interaction between a location resource server and a mobile communications device.

FIG. 4 is a flowchart which illustrates how an electronic service/geographic location database is provided to mobile communications device 100 and subsequently used for mobile location service provisioning. Location resource server 103 includes elements 200 and 202. Element 200 contains the user preferences for service interaction as well as data for mobile communications device 100. The user preferences for service interaction include those described above. The data for mobile communications device 100 includes user interface limitations, storage limitations, and connection limitations. Element 202 includes the location based service data record(s). The location based service data record includes geographic location area definitions; the type of information—push or pull; information associated with the location, e.g., a URL, other resource locators or data associated with the location; and information categories such as "restaurant" and "Chinese." Elements 200 and 202 are combined in step S1 via paths P4 and P5 to form a location service database map. Once step S1 is complete, step S2 is initiated which downloads the database map to mobile communications device 100 via link L1. The initiation of step S2 can be accomplished with several procedures. Step S2 may be infrequent or occur on a periodic cycle such as hourly or daily; step S2 may be initiated when mobile communications device 100 moves outside the boundaries of the existing stored map database; step S2 may be initiated when user preferences held by location resource server 103 are updated; step S2 may be initiated with a time-based trigger or when mobile communications device 100 is turned on or off; step S2 may be initiated when a user requests information or a location based service data record update is required; or step S2 might also, for example, be initiated by the mobile device crossing the boundary between two wide-area network cells. The above procedures are illustrative only and are not intended as limitations on the types of procedures which may be used.

The downloaded information is sent via link L1 to mobile communications device 100 at which time step S3 is initiated. Step S3 initiates an internal scan for information services. Element 204 includes user preferences held on mobile communications device 100. The user preferences are additional preferences which are held locally on mobile communications device 100 and include items such as short term preference modifications, private preferences, and frequently updated preferences and profile data such as a phone book and push alert choices. Element 204 inputs the user preferences through path P3 into step S3. Step S4 is then initiated to check for the current location of mobile communications device 100. Step S4 occurs frequently on a second or minute based cycle when searching for push services. Step S5 is then initiated to compare the new location to the local map database. Step S6 then decides whether service is available for the current location. If no service is available, the process continues to step S9. Step S9 provides return path P6 to step S3 based on a location search algorithm found in mobile communications device 100. Step S9 modifies the search frequency according to the algorithm and the inputs, e.g., service density, mobile device speed, location accuracy available, and service geographic match area. If a service is available, step S7 is initiated which includes a matching filter to compare the service against the local preference information derived from element 204. Step S8 chooses an action based on the information record for location and the matching filter output from step S7. If no action is required, the process goes to step S9 via path P7. If information is in the local data record, step S10 is initiated via path P1 to present the available information to the user. If additional information is needed, step S11 is initiated via path P2 to request additional information from a remote information server 104 via communication network 102.

Figure 5:
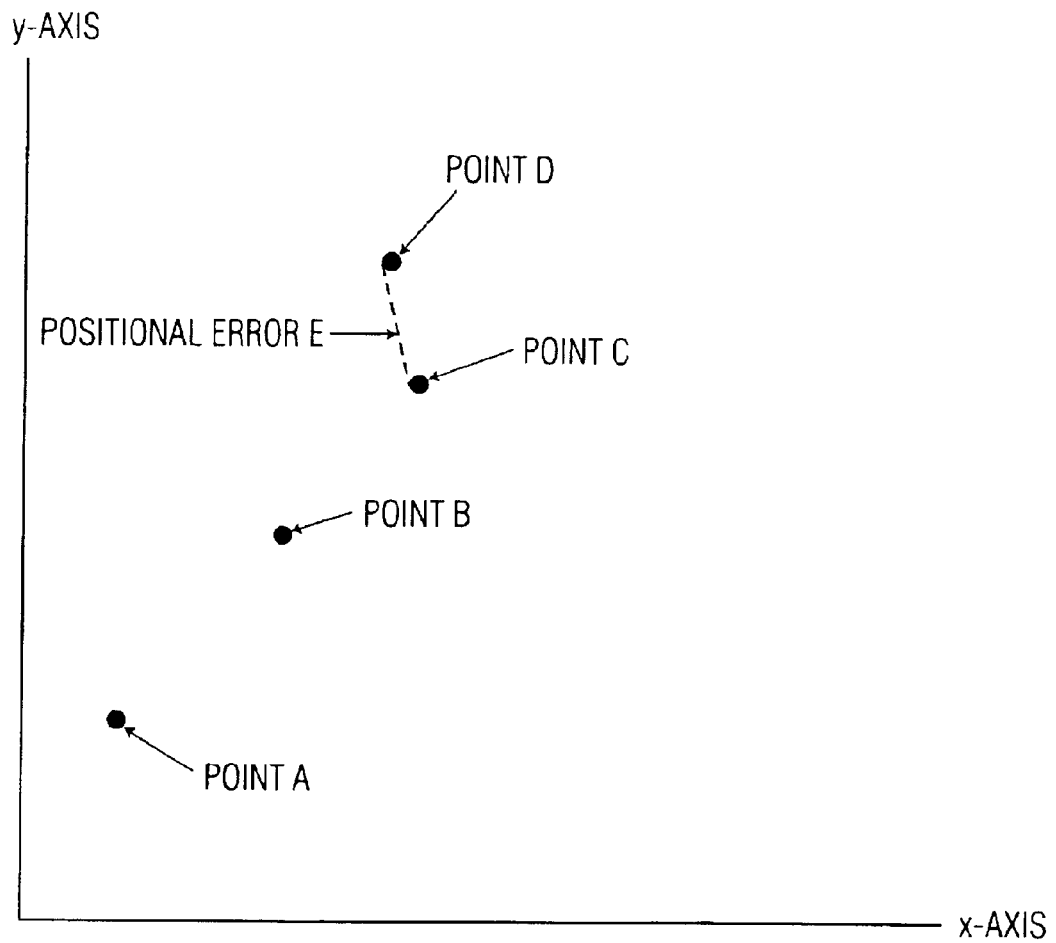
FIG. 5 is a schematic representation of the method of location interpolation and prediction according to a mathematical algorithm.

FIG. 5 is a schematic representation of a location determination process using a mathematical prediction algorithm. The location of mobile communications device 100 is measured using location determination system 117 described above. At time T, mobile communications device 100 is found to be at point A with Cartesian coordinates (x,y). At time T+t, mobile communications device 100 is found to be at point B with coordinates (x+a, y+b). A simple algorithm based on the assumption that mobile communications device 100 is travelling in a straight line is used to predict the location of mobile communications device 100; therefore, mobile communications device 100 is predicted to be at point C with coordinates (x+2a, y+2b) at time T+2t. The algorithm may be modified by additional measurements from location determination system 117 which produces a value for positional error E. Point D indicates the actual location of mobile communications device 100 at time T+2t. Well-known mathematical techniques may be used with the measurements to predict and interpolate the position of mobile communications device 100 over time. These may include, for instance, second- or higher-order interpolation schemes, inverse interpolation methods, data averaging and smoothing techniques to reduce the influence of small directional or velocity fluctuations of the path of the mobile device. The rate of location updating may be modified within the algorithm. Also, the algorithm may fit the path of mobile communications device 100 to alternative predicted paths. The algorithm to predict location may use a number of inputs to modify the process by which the mobile location is determined for example, rate of location change, the value of positional error E, accuracy requirements, and the granularity of location based information and fit of mobile movement to known geographic features such as roads and buildings.

By using actual measurements and calculations, the location service matching system can maintain updated knowledge of the location of mobile communications device 100 and the need for measured location fixes is reduced. Power in mobile communications device 100 is saved and network interaction with network based location determination systems is minimized. Interpolation between known data points may increase location accuracy and provide real-time knowledge of the location of mobile communications device 100. In essence, the current geographic location of mobile communications device 100 may be determined by the process of both measurement and prediction or interpolation based on calculation.

Location prediction may be made over any time period. Rapid calculation and measurement cycles which track the movements of mobile communications device 100 every few seconds could be used to track real-time movement of mobile communications device 100 along a path. Alternatively, a long term profile covering several hours or days could be used to predict future user movement. A user who is always found to be in a particular area of a city on certain days of the week, e.g., at work, but elsewhere in the evenings and weekends, e.g., at home, could have location service database maps preloaded for both locations overnight, thereby saving network resources at peak times.

Figure 6:
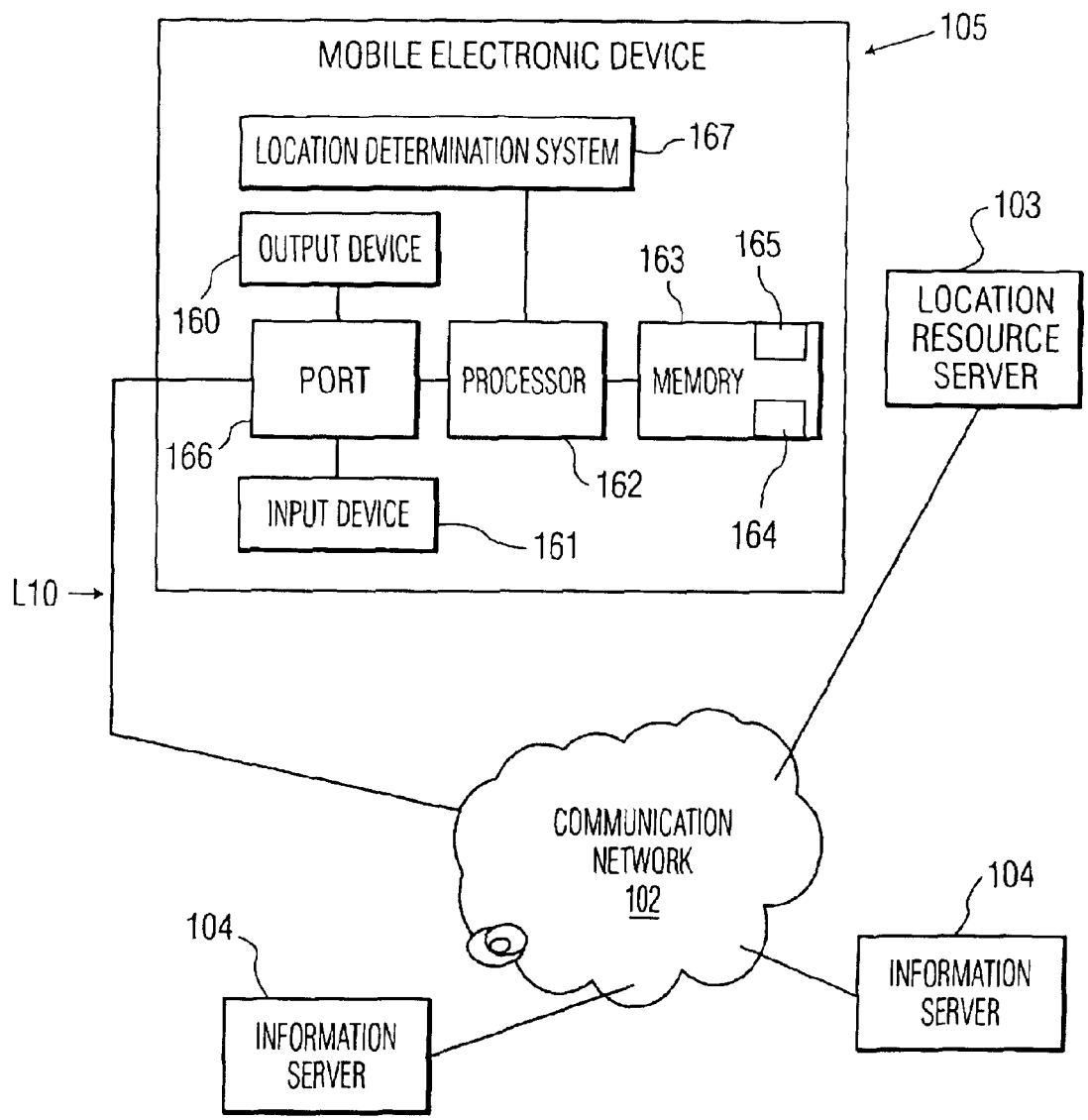
FIG. 6 is an alternative embodiment of the invention.

FIG. 6 is an alternative embodiment of the present invention. Mobile electronic device 105 communicates with communication network 102 via port 166. The communication may only be possible when mobile electronic device 105 is expressly connected to communication network 102 via non-permanent link L10. Link L10 could be a dial up modem, a temporary connection to a wired or wireless LAN, or an optical or acoustic coupler. Mobile electronic device 105 could be a portable data assistant (PDA), personal computer, or other mobile or portable device which is able to periodically connect to communication network 102. Mobile electronic device 105 includes processor 162 which executes program instructions 164 held in memory 163. Memory 163 includes random access memory for program execution and non volatile memory 165 for storage of program instructions 164 and system data. Mobile electronic device 105 also includes input device 161, e.g., a keyboard, microphone, touch screen or mouse, and output device 160, e.g., an LCD graphical display, earpiece or speaker. Additionally, mobile electronic device 105 includes location determination system 167 by which mobile electronic device 105 is able to determine its current geographic location. A well-known method to provide the location determination function is to use a GPS (Global Positioning System) receiver, which is able to receive satellite signals to determine location to within approximately 50 meters. GPS is an example of a self-contained location system. Another self-contained location system is a system which receives signals from short range wireless beacons, e.g., radio, acoustic or infrared beacons, which emit an identifying location signal to mobile electronic devices 105 within range.

In operation, the download of a map database may be initiated by a user actively connecting mobile electronic device 105 to communication network 102, thereby connecting to location resource server 103 and information server 104. The user may also initiate the choice of the downloaded map or map fragment based on prior knowledge of the planned activities of the user. While in communication, mobile electronic device 105 is able to upload location history information to location resource server 103 which permits long term location profile manipulation and map download to be accomplished as previously described. In this embodiment, where real-time access to communication network 102 is not possible, the downloaded map database may be the only source of information when a location/information match is encountered using location determination system 167. Additional location resource locators may be stored in memory 163 or non volatile memory 165 for subsequent use when mobile electronic device 105 is able to connect to communication network 102. This embodiment permits the pre-loading of a location service map to mobile electronic device 105 to use while mobile and unable to connect to communication network 102.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A mobile communication device comprising:
   a location determination element;
   a radio frequency transceiver connected to said location determination element;
   an electronic memory connected to said transceiver;
   a processor connected to said location determination element, said transceiver, and said memory; and
   an output element connected to said processor;
   wherein the mobile communication device is configured to receive a subset of the information of a location service provider, the subset of information regarding resources available proximate the location of the mobile communication device; wherein the mobile communication device is configured to receive the subset of information in response to any one of a plurality of triggering conditions; and wherein the mobile communication device is further configured to produce one or more long term user location profiles.

2. The device according to claim 1, wherein the plurality of triggering conditions comprise a device power-on sequence, a preference update, a boundary crossing by the device, a registration with a cell of a cellular communication system, and a periodic time-based request.

3. The device according to claim 1 wherein said memory has an algorithm stored therein.

4. The device according to claim 3 wherein said algorithm comprises a location prediction algorithm.

5. The device according to claim 3 wherein said algorithm comprises a time based algorithm which operates on time preference information.

6. The device according to claim 5 and further including an input element whereby the user can input time preference selections into the device.

7. The device according to claim 3 wherein said algorithm comprises a geographic preference algorithm.

8. The device according to claim 3 wherein said algorithm comprises a subject matter preference algorithm.

9. The device according to claim 1 and further including an input element whereby the user can input information into the device and store said information in the memory.

10. A communication system comprising:
    a mobile communication device including a location determination element; a radio frequency transceiver connected to said location determination element; a memory connected to said transceiver; a processor connected to said location determination element, said transceiver, and said memory; and an output connected to said processor; and
    a location resource server including a memory in which data is stored, said data pertaining to resources available at selected geographic locations, said location resource server capable of establishing communication with said mobile communication device;
    whereby said location resource server can establish communication with said device and download information to said mobile communication device, whereby said device can process such information and output processed information on its output, said processed information pertaining to resources available at the location of said mobile communication device, and wherein the mobile communication device is further configured to produce one or more long term user location profiles and to receive information that is a subset of the information that can be downloaded from the location resource server in response to any one of a plurality of triggering conditions.

11. The system according to claim 10 wherein said device memory includes an algorithm.

12. The system according to claim 11 wherein said algorithm includes a subject matter preference algorithm.

13. The system according to claim 11 wherein said algorithm includes a location prediction algorithm.

14. The system according to claim 10 wherein said mobile communication device includes an input.

15. The system according to claim 14 including a time based algorithm for processing information based on time preferences selected by the user on said input.

16. The system according to claim 11 wherein said algorithm includes a geographic preference algorithm.

17. A method for supplying geographically based resource information to a mobile communication device, comprising:
    determining a long term location profile of said device;
    communicating said long term location profile to a location resource server;
    selecting information regarding items in a region based on said communicated determined long term location profile; and
    downloading said selected information to said device;
    wherein said selected information comprises contact information.

18. The method according to claim 17, further comprising processing said downloaded information in said device; and communicating said processed information to a user;

wherein processing in said device includes applying user preferences as a filter, and wherein contact information comprises one or more of the group consisting of email addresses, telephone numbers, and URLS.

19. The method according to claim 18 wherein said processing includes applying a subject matter based preference.

20. The method according to claim 18 wherein said processing includes applying a geographically based preference.

21. The method according to claim 18, further comprising processing in said device for predicting the future location of said device.

22. The method of claim 18, wherein the downloading is in response to a preference update.

23. The method of claim 18, wherein the downloading is in response to the mobile communication device moving outside a predetermined boundary.

24. The method of claim 18, wherein the downloading is in response to a time-based trigger.

25. The method of claim 18, wherein the user preference comprises temporal parameters that specify when the selected information may not be pushed to the mobile communication device.

26. The method of claim 18, wherein the user preference comprises numerical parameters that specify the number of information items that will be accepted.

27. The method of claim 17, wherein downloading the selected information to the device comprises downloading to the device during an off-peak period of usage for the location resource server.

* * * * *

(12) INTER PARTES REEXAMINATION CERTIFICATE (773rd)
United States Patent
Rankin et al.

(10) Number: US 6,879,838 C1
(45) Certificate Issued: Dec. 23, 2013

(54) DISTRIBUTED LOCATION BASED SERVICE SYSTEM

(75) Inventors: Paul John Rankin, Horley (GB); Jonathan Charles Griffiths, Fremont, CA (US)

(73) Assignee: Mobile Enhancement Solutions LLC, Frisco, TX (US)

Reexamination Request:
No. 95/002,412, Sep. 15, 2012

Reexamination Certificate for:
Patent No.: 6,879,838
Issued: Apr. 12, 2005
Appl. No.: 09/839,558
Filed: Apr. 20, 2001

(51) Int. Cl.
*H04Q 7/22* (2006.01)

(52) U.S. Cl.
USPC .......... 455/456.6; 455/414.2; 455/456.1; 455/456.3; 701/532

(58) Field of Classification Search
None
See application file for complete search history.

(56) References Cited

To view the complete listing of prior art documents cited during the proceeding for Reexamination Control Number 95/002,412, please refer to the USPTO's public Patent Application Information Retrieval (PAIR) system under the Display References tab.

*Primary Examiner* — Charles Craver

(57) ABSTRACT

A system, apparatus, and method for providing a distributed location based service system to a mobile user. Information related to a particular geographic location may be electronically transferred to a mobile electronic device, without a request from the user, and interpreted locally on the device in the form of a virtual map of location based resources. The mobile device is capable of determining its location using a GPS (Global Positioning System) or a process of measurement and prediction based on calculation. The mobile device can then use the location information and compare it to available location based resources within the device.

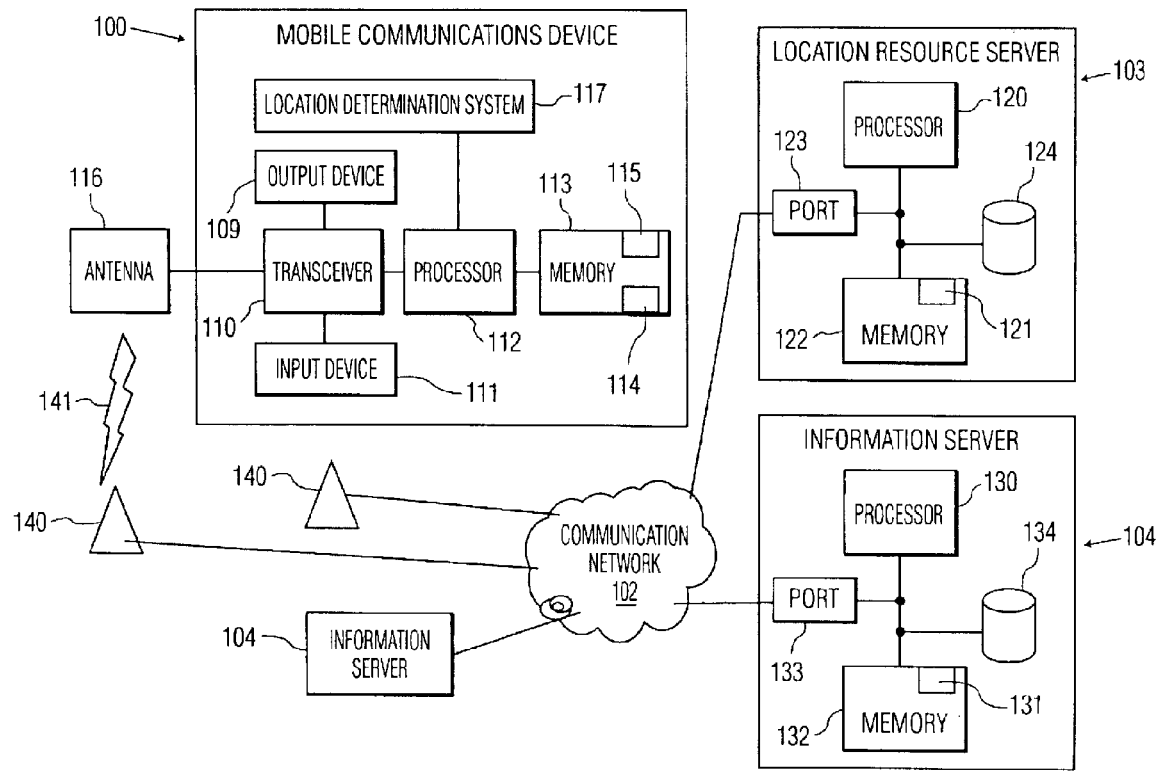

US 6,879,838 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 10, 17 and 27 is confirmed.

New claims 28-67 are added and determined to be patentable.

Claims 2-9, 11-16 and 18-26 were not reexamined.

28. *The mobile communication device as set forth in claim 1, wherein the plurality of triggering conditions include a device power-on condition.*

29. *The mobile communication device as set forth in claim 1, wherein the plurality of triggering conditions include a user preference update condition.*

30. *The mobile communication device as set forth in claim 1, wherein the plurality of triggering conditions include a user input condition.*

31. *The mobile communication device as set forth in claim 1, wherein the plurality of triggering conditions include a user request condition.*

32. *The mobile communication device as set forth in claim 1, wherein the plurality of triggering conditions include a determination that the mobile communication device has moved to a new location which requires new information.*

33. *The mobile communication device as set forth in claim 1, wherein the plurality of triggering conditions include a boundary crossing condition wherein a determination is made that the mobile communication device has crossed a boundary between two location service areas.*

34. *The mobile communication device as set forth in claim 33, wherein the two location service areas are not wireless LAN cells.*

35. *The mobile communication device as set forth in claim 1, wherein the plurality of triggering conditions include a time-based trigger condition.*

36. *The mobile communication device as set forth in claim 1, wherein the plurality of triggering conditions include a determination that the mobile communication device has moved outside the boundaries of an existing stored map.*

37. *The mobile communication device as set forth in claim 32, wherein the new information includes a new map fragment.*

38. *The mobile communication device as set forth in claim 1, wherein the mobile communication device is further configured to request additional information from the location service provider, in addition to the subset of information, in response to user input.*

39. *The mobile communication device as set forth in claim 38, wherein the user input includes a user search request.*

40. *The mobile communication device as set forth in claim 38, wherein the user input includes a user preference update.*

41. *The mobile communication device as set forth in claim 1, wherein the subset of information includes a portion of a map relevant to a current location of the mobile communication device.*

42. *The mobile communication device as set forth in claim 41, wherein the portion of the map is available for use when the mobile communication device is unable to communicate with the location service provider.*

43. *The mobile communication device as set forth in claim 41, wherein the portion of the map is retrievable for use when the mobile communication device is unable to communicate with the location service provider.*

44. *The mobile communication device as set forth in claim 1, wherein the subset of information is based at least in part on user preferences.*

45. *The mobile communication device as set forth in claim 44, wherein the mobile communication device is further configured to enable a user to enter and upload user preferences to a web server associated with the location service provider via a web server user interface.*

46. *The mobile communication device as set forth in claim 44, wherein the user preferences include a category of information preference.*

47. *The mobile communication device as set forth in claim 44, wherein the user preferences include a number of information items preference.*

48. *The mobile communication device as set forth in claim 44, wherein the user preferences include a time preference.*

49. *The mobile communication device as set forth in claim 44, wherein the user preferences include a push service elimination preference.*

50. *The mobile communication device as set forth in claim 1, wherein the subset of information includes a map.*

51. *The mobile communication device as set forth in claim 50, wherein the map includes latitude and longitude coordinates.*

52. *The mobile communication device as set forth in claim 1, wherein the subset of information includes a URL.*

53. *The mobile communication device as set forth in claim 1, wherein the subset of information includes map data for at least two different locations determined based at least in part on the long term user location profile.*

54. *The mobile communication device as set forth in claim 1, wherein the subset of information is determined at least in part based on the long term user location profile.*

55. *The mobile communication device as set forth in claim 54, wherein the subset of information is determined without using the speed of movement of the mobile communication device.*

56. *The mobile communication device as set forth in claim 1, wherein the subset of information is determined without using the speed of movement of the mobile communication device.*

57. *The mobile communication device as set forth in claim 1, wherein the subset of information includes a first subset of information relevant to a first location and a second subset of information relevant to a second location.*

58. *The mobile communication device as set forth in claim 57, wherein the first and second locations are determined at least in part based on the long term user location profile.*

59. *The mobile communication device as set forth in claim 58, wherein the first location is a current location of the mobile communication device, and the second location is a predicted future location of the mobile communication device at least several hours from a current time.*

60. *The mobile communication device as set forth in claim 57, wherein the first location is a current location of the* mobile communication device, and the second location is a predicted future location of the mobile communication device at least several hours from a current time.

61. The mobile communication device as set forth in claim 1, wherein the mobile communication device is further configured to use the location determination element to periodically update the location of the mobile communication device, and to periodically transmit the updated location of the mobile communication device to the location service provider.

62. The mobile communication device as set forth in claim 61, wherein the plurality of triggering conditions include the transmission of the updated location of the mobile communication device to the location service provider.

63. The mobile communication device as set forth in claim 1, wherein the mobile communication device is further configured to use the location determination element to update the location of the mobile communication device, and to transmit the updated location of the mobile communication device to the location service provider.

64. The mobile communication device as set forth in claim 63, wherein the plurality of triggering conditions include the transmission of the updated location of the mobile communication device to the location service provider.

65. The mobile communication device as set forth in claim 62, wherein the subset of information includes a map portion relevant to the updated location of the mobile communication device.

66. The mobile communication device as set forth in claim 64, wherein the subset of information includes a map portion relevant to the updated location of the mobile communication device.

67. The mobile communication device as set forth in claim 1, wherein the mobile communication device is further configured to use the location determination element to periodically update and record the location of the mobile communication device, and to transmit one or more recorded locations of the mobile communication device to the location service provider.

* * * * *